(12) United States Patent  
Olson et al.

(10) Patent No.: US 10,948,584 B2  
(45) Date of Patent: Mar. 16, 2021

(54) LATENT OSCILLATOR FREQUENCY ESTIMATION FOR RANGING MEASUREMENTS

(71) Applicant: The Regents of The University of Michigan, Ann Arbor, MI (US)

(72) Inventors: Edwin Olson, Ann Arbor, MI (US); Sean M. Messenger, Ann Arbor, MI (US); John Mamish, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 189 days.

(21) Appl. No.: 15/920,730

(22) Filed: Mar. 14, 2018

(65) Prior Publication Data

US 2018/0267162 A1 Sep. 20, 2018

Related U.S. Application Data

(60) Provisional application No. 62/471,559, filed on Mar. 15, 2017.

(51) Int. Cl.
*G01S 13/76* (2006.01)

(52) U.S. Cl.
CPC .......... *G01S 13/765* (2013.01); *G01S 13/767* (2013.01)

(58) Field of Classification Search
CPC ........ G01S 13/765; G01S 13/767; G01S 5/02; G01S 1/24; G01S 3/02; G01S 5/0009; G01S 5/021

(Continued)

(56) References Cited

U.S. PATENT DOCUMENTS 6,057,851 A * 5/2000 Luken .................... G06T 15/04  
    345/586  
6,768,730 B1 7/2004 Whitehill  
(Continued)

FOREIGN PATENT DOCUMENTS

WO WO-2016180952 A1 11/2016

OTHER PUBLICATIONS

Wymeersch, H., J. Lien, and M.Z. Win. "Cooperative Localization in Wireless Networks." Proceedings of the IEEE 97.2 (2009): 427-450. (Year: 2009).*

(Continued)

*Primary Examiner* — Vladimir Magloire  
*Assistant Examiner* — Alexander L. Syrkin  
(74) *Attorney, Agent, or Firm* — Harness, Dickey & Pierce, P.L.C.

(57) ABSTRACT

Time of Flight ranging using double-sided two-way ranging (DS-TWR) is a conventional method of ranging with ultra-wideband (UWB) radios and has been shown to have ranging accuracies on the order of tens of centimeters. This approach requires several transmissions for each range measurement, which does not scale well for multi-agent robotics because of the bandwidth needed for ranging measurements. This disclosure proposes a latent model for clock frequencies using a factor graph that enables greater consistency of clock synchronization and increases the rate of useful range measurements. This model is an effective and robust improvement to conventional DS-TWR that can leverage shared information from a network of robots. An increase in the rate of range measurements of 232% was obtained as compared to DS-TWR with the same hardware and transmission rate, and with a mean square error of range measurements of 20 cm.

19 Claims, 7 Drawing Sheets

(58) Field of Classification Search
USPC .................................................. 342/145, 387
See application file for complete search history.

(56) References Cited

U.S. PATENT DOCUMENTS

| | | | |
|---|---|---|---|
| 7,072,465 | B1 | 7/2006 | Benesty et al. |
| 7,076,259 | B2 | 7/2006 | Belcea |
| 7,221,656 | B1 | 5/2007 | Aweya et al. |
| 9,961,459 | B2* | 5/2018 | Hansson ................. H04W 4/80 |
| 2005/0175076 | A1 | 8/2005 | Miller et al. |
| 2008/0258973 | A1* | 10/2008 | Heidari-Bateni ..... G01S 13/767 342/387 |
| 2009/0243934 | A1 | 10/2009 | Ameti et al. |
| 2014/0145831 | A1* | 5/2014 | Bassan-Eskenazi ......................... G01S 13/767 340/10.4 |

OTHER PUBLICATIONS

Wymeersch "Cooperative Localization in Wireless Networks." Proceedings of the IEEE 97.2 (2009): 427-450 (Year: 2009).*
Wymeersch, H., J. Lien, and M.Z. Win. "Cooperative Localization in Wireless Networks." Proceedings of the IEEE 97.2 (2009): 427-450. (Year: 2009) (Year: 2009) (Year: 2009).*
Fitzgerald and P. J. W. Rayner, "Bayesian signal processing," IEE Colloquium onSignal Processing in 2000 (Ref. No. 1999/106), 1999, pp. 2/1-2/6. (Year: 1999) (Year: 1999).*
A. Gupta and B. S. Rajan, "Reduced Complexity Sum-Product Algorithm for Decoding Nonlinear Network Codes and In-Network Function Computation," in IEEE Transactions on Communications, vol. 64, No. 10, pp. 4070-4082, Oct. 2016, doi: 10.1109/TCOMM. 2016.2602347. (Year: 2016).*
B. Etzlinger, F. Meyer, A. Springer, F. Hlawatsch and H. Wymeersch, "Cooperative simultaneous localization and synchronization: A distributed hybrid message passing algorithm," 2013 Asilomar Conf. on Signals, Systems and Computers, Pacific Grove, CA, 2013, pp. 1978-1982, doi: 10.1109/ACSSC.2013.6 (Year: 2013).*
T. Van Nguyen, Y. Jeong, H. Shin and M. Z. Win, "Machine Learning for Wideband Localization," in IEEE Journal on Selected Areas in Communications, vol. 33, No. 7, pp. 1357-1380, Jul. 2015, doi: 10.1109/JSAC.2015.2430191. (Year: 2015).*
Olson, Edwin "A passive solution to the sensor synchronization problem", Intelligent Robot and Systems (IROS), 2010 IEEE/RSJ International Conference on IEEE,(2010).
Choliz, Juan et al "Comparison of algorithms for uwb indoor location and tracking systems", Vehicular Technology Conference (VTC Spring), 2011 IEEE 73rd IEEE (2011).
D'Amico, Antonio, et al "Cramer-Rao bound for clock drift in UWB ranging systems", IEEE Wireless Communications Letters 2.6 (2013).
D'Amico, A., et al "Ultra-wideband TOA estimation in the presence of clock frequency offset", IEEE Transactions on Wireless Communications 12.4 (2013).
Wymeersch et al "Cooperative Localization in Wireless Networks" in: Proceedings of the IEEE, vol. 97, No. 2, Mar. 16, 2009.
Segura et al "Ultra Wide-Band Localization and SLAM: A Comparative Study for Mobile Robot Navigation" In: Sensors, vol. 11, No. 2 (Feb. 10, 2011).

* cited by examiner

LATENT OSCILLATOR FREQUENCY ESTIMATION FOR RANGING MEASUREMENTS

CROSS-REFERENCE TO RELATED APPLICATIONS

This application claims the benefit of U.S. Provisional Application No. 62/471,559, filed on Mar. 15, 2017. The entire disclosure of the above application is incorporated herein by reference.

GOVERNMENT CLAUSE

This invention was made with government support under contract W911NF-15-C-0221 awarded by the U.S. Army Research Laboratory's Army Research Office. The Government has certain rights in this invention.

FIELD

The present disclosure relates to latent oscillator frequency estimation for ranging measurements.

BACKGROUND

Ultra-wideband (UWB) radios are readily accessible and of interest for robotics applications where standard techniques for localization such as GPS may fail. Multi-agent robotics systems benefit from distance measurements made with UWB radios between agents or objects of interest.

To make accurate range measurements, radio packet time-of-arrival (ToA) must be measured precisely and accurately. The use of UWB radios enables high precision ToA measurements, but the poor frequency stability of commodity oscillators results in low-accuracy ToA measurements, which leads to high range measurement error. This accuracy problem could be addressed by purchasing a larger, more expensive, and higher power consumption oscillator, but this isn't feasible for all systems. Instead, existing methods lower the ranging rate to perform oscillator calibration measurements.

In this disclosure, a UWB ranging approach is presented that requires fewer oscillator calibration measurements by estimating changes in clock frequency. This approach improves ranging rate, extends the accuracy and fidelity of localization schemes, scales with large sensor networks, and can result in lower power consumption of nodes in the system.

This section provides background information related to the present disclosure which is not necessarily prior art.

SUMMARY

This section provides a general summary of the disclosure, and is not a comprehensive disclosure of its full scope or all of its features.

A computer-implemented method is presented for determining location of objects in a space. Each object is equipped with a wireless transceiver and transmits messages amongst the objects via the wireless transceiver. The method includes: modeling a system of objects using a factor graph having a plurality of variable vertices interconnected by a plurality of factor vertices, in which some vertices represent the location of a particular object at a given time and other vertices represent the frequency of an oscillator driving the wireless transceiver of the particular object at a given time; transmitting messages over time amongst the objects in the space; computing, by a given object, time of flight for each of a plurality of transmissions between the given object and objects in the space from which transmissions are received by the given object; and estimating, by the given object, location of the objects in the space using the computed time of flight values for the plurality of transmissions and the factor graph.

Moving objects may be modeled over time as a chain in the factor graph. Likewise, the frequency of the oscillator is modeled over time as a chain in the factor graph.

Location estimates may be constrained using range factors, where range factors are represented by factor vertices that interconnect a given variable vertex to another variable vertex corresponding to the given variable vertex and representing frequency. In an example embodiment, the range factor is defined as a difference between an expected range based on distance between objects and a time of flight measurement with scaling based on an estimate of relative frequencies of the oscillators of two objects at the time the measurement took place.

Location estimates may be constrained using position factors, where position factors are represented by factor vertices that interconnect the variable vertices that represent location. In an example embodiment, movement of the given object is measured using a sensor associated with the object and location estimates for the given object are constrained using the measured movement.

Location estimates may also be constrained using frequency factors, where frequency factors are represented by factor vertices that interconnect the variable vertices that represent frequency. In an example embodiment, the frequency factor is modeled as a zero mean Gaussian.

In one embodiment, location of the objects are estimated by solving a least squares problem using the computed time of flight values for the plurality of transmissions. For example, solving a least square problem using one of a gradient descent method or a Gauss-Newton method.

In one variant, frequency of an oscillator in one or more objects is directly observed and the factor graph is updated using the observed frequencies.

In another variant, at least one of the modeled objects in the factor graph includes a highly accurate clock, such as an atomic clock.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a factor graph representation of latent model. The chain of circles at the bottom represent latent frequency variables, the chain of circles marked with xy at the top represent a single device's position as it changes over time according to an odometer motion model, and the circle marked with an xy on the left represents a static device location. Conventional factor graph construction for the ranging measurements do not use the bottom frequency chain. The double circle on frequency estimates represent a measurement of frequency with high confidence from a DS-TWO reading.

In FIG. 10A, the modified DS-TWR-MA uses several fewer constrained transmissions immediately after a DS-TWR event, and this results in a higher ranging rate but some of the measurements have larger errors because of an assumption on the frequency being constant by first order approximation. Both of those assumptions exhibit similar errors, shown is for first order approximation. In FIG. 10B, the proposed latent method uses information from surrounding DS-TWR events and other connected measurements in the factor graph such as odometry to better constrain the multiple acknowledgements. This method allows more acknowledgements before reaching the same error bound as DS-TWR-MA. The method can perform 10 additional responses while staying within the error of a single response from DS-TWR-MA.

Corresponding reference numerals indicate corresponding parts throughout the several views of the drawings.

DETAILED DESCRIPTION

Example embodiments will now be described more fully with reference to the accompanying drawings.

UWB radios perform well in a variety of environments by leveraging a bandwidth of over 500 MHz to provide time of flight (TOF) measurements with high time resolution and strong multipath mitigation. Many of the techniques developed for UWB TOF ranging have requirements that can be difficult to achieve. Some require external clock synchronization, which is infeasible for multi-agent field robotics. Others require three or more messages to make a single range measurement, which can be restrictive in terms of scaling, power consumption, and sampling rate.

Double-sided two-way ranging (DS-TWR) successfully bypasses the clock synchronicity requirement by sending extra packets to estimate and measurement clock offsets, but this technique has poor overhead in terms of scaling to large networks.

Many common approaches to TOF ranging using stationary UWB radio beacons are variants of Double-Sided Two-Way Ranging (DS-TWR). In a basic DS-TWR implementation, a single range measurement between two UWB radios R, I consists of three transmissions, represented in FIG. 1 as diagonal arrows. The transmission and reception time of each message is recorded with high precision using digital receiver and on-board calculations for each radio.

Figure 1:
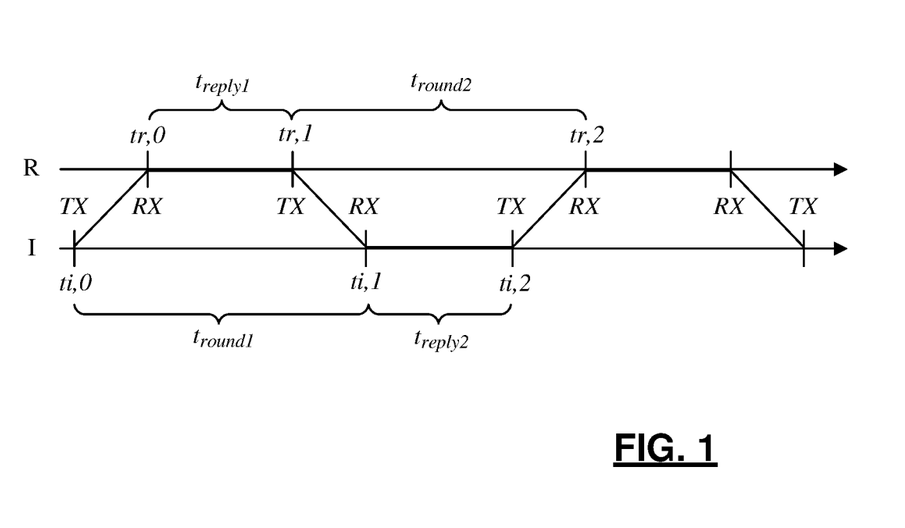
FIG. 1 is a diagram showing the timing of message transmission between two devices for DS-TWR range measurements. There are three transmissions used for ranging, and the fourth can be used to send summary data back to the initiating device. Each device's clock progresses to the right with time, and timestamps are measured from the device's clock. TX and RX indicate transmission or reception of a message at the point in time.

For example, the time of flight between the two radios can be calculated using only $t_{i,0}$, $t_{i,1}$, $t_{r,0}$ and $t_{r,1}$ with the single-sided two-way ranging (SS-TWR) formula to avoid the third transmission of DS-TWR.

$$TOF = \frac{(t_{i,1} - t_{i,0}) - (t_{r,1} - t_{r,0})}{2} \quad (1)$$

$$= \frac{t_{round1} - t_{reply1}}{2} \quad (2)$$

The accuracy of the measured values for $t_{round1}$ and $t_{reply1}$ depend on the frequency stability of the crystal oscillators driving the radios, which have non-negligible drift that accumulate as much as 0.1 parts per million (ppm) per second for standard oscillators. Previous work has recognized that error accumulation due to oscillator drift makes TOF measurements unusually inaccurate.

To remedy this problem, a third transmission can be made, resulting in two more measured times $t_{i,2}$ and $t_{r,2}$. The frequency ratio between the measuring $t_{round1}$ and $t_{reply1}$ can be calculated with $$\alpha = \frac{t_{i,2} - t_{i,0}}{t_{r,2} - t_{r,0}} \quad (3)$$

This multiple correction factor can then be used to improve the value of $t_{reply}$ in the TOF formula, Equation 1.

By performing many temporally local range measurements, recent methods have decreased the average number of radio transmissions per range measurement. An early approach, DS-TWR Multiple Acknowledgement (DS-TWR-MA) performs a single DS-TWR transaction to find the frequency correction factor α, described in Equation 3. As long as the frequencies of the two radios do not change significantly, subsequent range measurements can be made with a single transmission. Generally, crystal oscillators suffer from poor frequency stability, limiting the number of range measurements that can be performed with a single transmission as a response for DS-TWR-MA before another DS-TWR measurement is needed to re-calibrate the crystal oscillators. As time between oscillator-calibrating DS-TWR measurements increases, error in ranging measurement increases. Extending this limit would improve the sampling rate for ranges and reduce power consumption in responder nodes.

Another approach, called Burst Mode DS-TWR (DS-TWR-DM), achieves one range measurement per two transmissions, however, each of the participating nodes can only access half of the ranging data in real-time. Moreover, existing research does not address the scalability of the DS-TWR-BM approach, which may present challenges because it requires continuous participation from both nodes involved in range measurements.

A method is presented to improve the ranging rate between radios by estimating how the clock synchronization changes between pairs of devices over time. If accurate clock synchronization is known, individual transmissions can provide range information. If accurate clock synchronization is not known, three transmissions are required for a range measurement. For demonstration purposes, results presented here are based on a commercial off the shelf DWM1000 UWB modules, which are a complete sensor module including antenna for under $30. The devices have average error less than 10 cm and are provided in a form factor that easily integrates into other systems, such as robots or vehicles. The latent model, however, is not restricted to application on the DWM1000 UWB modules, and could be applicable to any time of flight measurement device that has a synchronization challenge or uses DS-TWR to compensate for synchronization.

An accurate model of device frequency over time would allow clock synchronization. Many ranging devices are oscillators that drift on the order of 10 ppm, but whose frequency also drifts gradually over time about 0.1 ppm per second. During that time that a single transmission is propagating through the air, a drift in frequency induces an error in the low picosecond range. In this case, other sources of error such as the precision of determining arrival time limits the noise floor. The error from oscillator drift is $$\text{error} = \Delta T \left(1 - \frac{f_A + f_B}{2}\right) \quad (4)$$

where ΔT is the time taken to measure $t_{round1}$ and $t_{reply1}$, and $f_A$ and $f_B$ times the nominal frequency. For example, if time ΔT=333 ns (the time of flight for 100 m), the induced error due to oscillator drift at 10 ppm is only 6.7 picoseconds or 0.002 mm. This error quickly grows as the time taken to perform the measurement increases over multiple transmissions, but is correctable with information about the values $f_A$ and $f_B$.

Figure 2A:
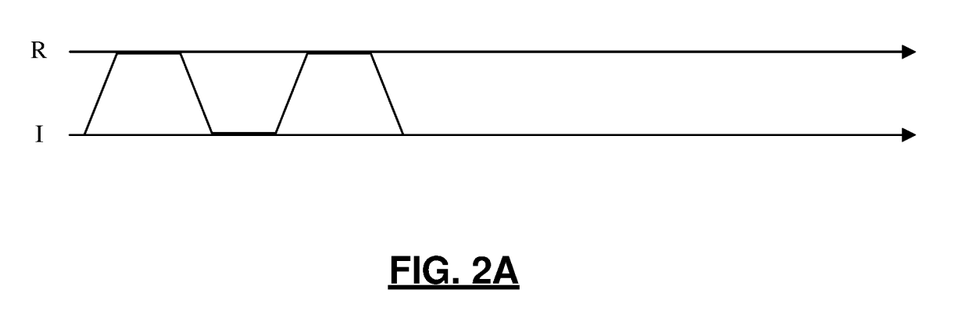
FIG. 2A-2C are diagrams illustrating three different ranging protocols: (a) DS-TWR makes a range measurement using four transmissions, the final of which is only used for sending summary information back to the initiator device; (b) DS-TWR-MA is a modification to DS-TWR that uses more terminal transmissions that leverages temporal proximity to a DS-TWR message that synchronizes clocks; and (c) the proposed latent method explicitly models assumptions made in the conventional DS-TWR-MA and therefore allows the number of multiple responses to grow beyond what is feasible in a DS-TWR-MA framework.
Figure 2B:
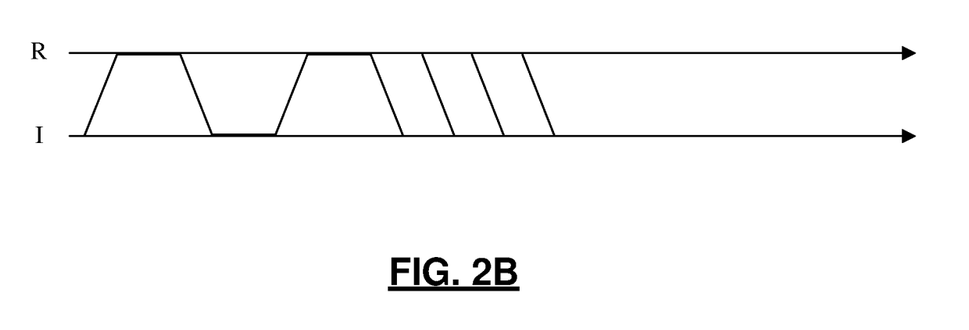
Figure 2C:
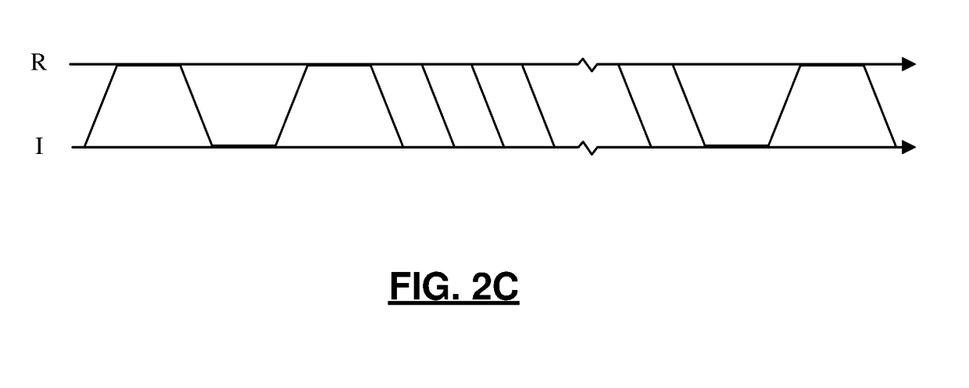

In DS-TWR-MA, increasing the ranging rate necessarily increases ΔT, which causes error in range measurements to grow as seen in FIGS. 2A-2C. DS-TWR-MA initiates a new DS-TWR range measurement at a fixed rate to reset ΔT back to zero with a new frequency estimate, calculated with Equation 3. When the system uses the DS-TWR-MA protocol, ΔT grows as large as 50 ms. In this case, the error from block frequency drift by doing a zero order hold estimation of the frequency can grow as large as 4 ns. This amount of error corresponds to a ranging error of 1.2 m. The increasing error as ΔT grows can be seen in the data plotted in FIG. 8. The approach set forth below uses essentially the same ranging protocol as DS-TWR-MA, but actively estimates a which allows one to achieve a much higher ΔT before the error of the ranging measurements increases to an unacceptable level. By allowing ΔT to grow larger, one can improve DS-TWR-MA's ranging rate.

Figure 3:
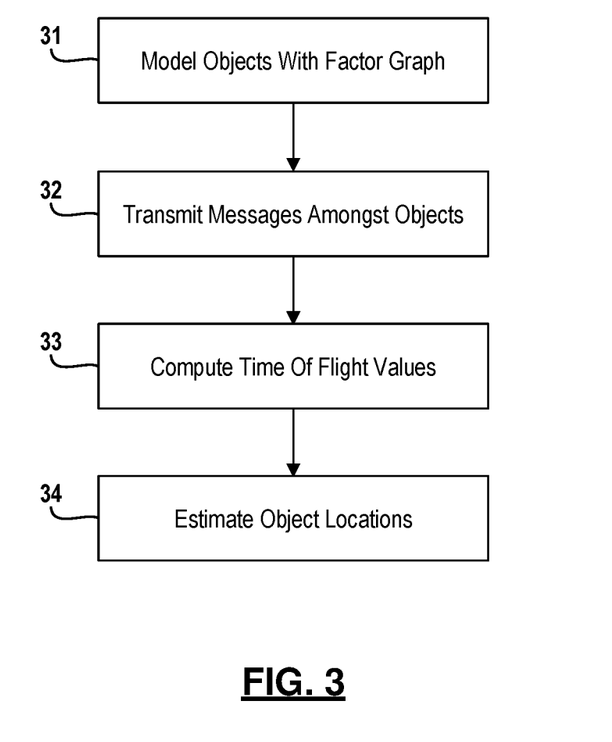
FIG. 3 is a flowchart providing an overview of the method for determining the location of objects in accordance with this disclosure.

FIG. 3 provides an overview of a method for determining the location of objects, such as robots. Each robot is equipped with a wireless transceiver that enables it to transmit messages amongst nearby robots. In an example embodiment, the wireless transceiver operates in accordance with ultra-wideband radio technology. While reference is made throughout this disclosure to UWB, the techniques set forth in this disclosure are applicable to other types of wireless transceivers as well, including GPS technology. Likewise, while reference is made to robots, this technique is applicable to other types of objects equipped with a wireless transceiver, including persons walking with mobile devices, vehicles, etc.

Figure 4:
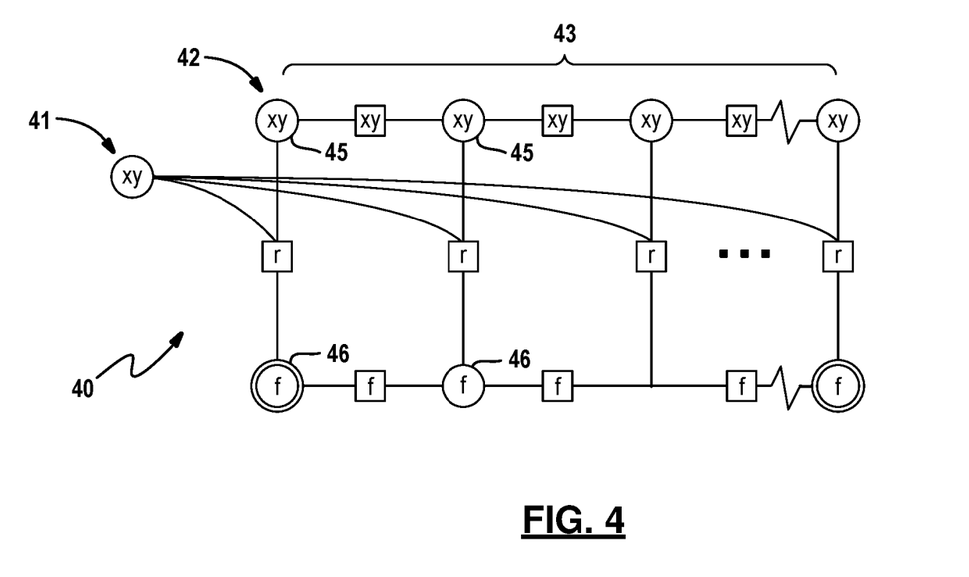

The localization problem is first modeled at 31 using a factor graph. Referring to FIG. 4, the objects may be modeled as stationary objects as indicated at 41 or as mobile objects at 42. Location of a particular object at a given time is represented by a variable vertex 45 in the factor graph 40. Location of mobile agents changes over time and thus is modeled as a chain in the factor graph as indicated at 43. In other embodiments, it is readily understood that both objects may be modeled as mobile agents. Moreover, from this example, one will readily understand how a factor graph can be extended to model more complex scenarios with three or more objects.

Additionally, frequency of an oscillator driving the wireless transceiver equipped in a particular object is modeled as a latent variable that changes over time. In FIG. 4, the latent variables representing frequency are shown as circles at the bottom and labeled 46. The fact that the clock frequencies vary motivates modeling frequencies over time as a chain in the factor graph 40 with relatively stiff links between consecutive estimates. In some embodiments, the latent model approach involves infrequent direct observations of relative clock frequencies and modeling their evolution over time. For example, the frequency ratio may be computed for every x range measurement (e.g., 10) using a third transmission as described above in equation (3). This allows one to have strong confidence about the relative frequencies in a window around each direct measurement and to have temporal feedback contributing to correcting adjacent measurements. Alternatively or additionally, one or more of the modeled objects may include an atomic clock. Readings from the atomic clock(s) may also be used to constrain the location estimations.

Oscillator frequency drifts can be considered to exhibit characteristics of a Gaussian random walk. With this assumption, oscillator frequency is modeled over time as a zero mean Gaussian prior with covariance proportional to time elapsed since the previous estimate, $$fn \sim \mathcal{N}(\mu_{f_{n-1}}, \sigma_f^2(t_{f_n} - t_{f_{n-1}}))  \quad (5)$$

Other models for frequency are contemplated within the broader aspects of this disclosure.

Frequency factors (i.e., squares marked by f in FIG. 4) and range factors (i.e., squares marked by r in FIG. 4) are used to constrain estimates. In an example embodiment, the range factor uses a relationship with two components in terms of pseudorange time of flight. The observation function $\hat{z}_{x_1,x_2,\alpha}$ for the range factor is the difference between an expected range based on a distance between devices and a time of flight measurement with scaling based on the estimate for the relative frequencies of the two devices at the time the measurement took place. The measurement function $\hat{z}_{x_1,x_2,\alpha}$ is zero in order to drive the distance to agree with the adjusted pseudorange in the observation function.

$$\hat{z}_{x1,x2,a} = \frac{dist(x1, x2)}{c} - \frac{t_{round} - \alpha_a t_{reply}}{2} \quad (6)$$

$$z_{x1,x2,a} = 0 \quad (7)$$

Terms $x_1$ and $x_2$ are the two-dimensional positions of the two devices making the measurement and $\alpha_a$ is the estimate for the relative frequencies of the devices at the time of the measurement. For simplicity, the example embodiment assumes a planar network (i.e., two dimensional). It is readily understood that this approach can be extended to a full three-dimension problem.

Frequency factors have observation $\hat{z}_{a,b}$ and measurement $z_{a,b}$ functions between nodes a and b, where $\alpha_a$ $\alpha_b$ are the estimates of the clock frequency of the respective node:

$$\hat{z}_{a,b} = \alpha_a - \alpha_b \quad (8)$$

$$z_{a,b} = 0 \quad (9)$$

By framing the problem in a factor graph framework, fusion with other data sources that can inform clock frequency is enabled, such as odometry global fixes and laser scan alignments.

Returning to FIG. 3, a plurality of message transmissions are transmitted over time at 32 amongst the objects. Schemes for transmitting messages amongst objects are known in the art and preferably occur at periodic time intervals. From the message transmissions, time of flight values can be computed at 33, for example using equation (1) above. In one embodiment, the localization problem is formulated by a given object in the space. That is, locations of objects are determined by a given object in relation to the given object. To do so, time of flight values are computed between the given object and any other objects from which transmission are received by the given object. In another embodiment, transmission and reception times for each transmitted message may be forwarded on to a central computing device. The central computing device in turn can compute time of flight values and estimate location for all of the objects in the space.

In either case, location of objects is estimated at 34 using the computed time of flight values and the factor graph. In the example embodiment, the observation functions assigned to the factor graph lead to a least squares problem, where the location of objects and frequency of the oscillator driving the wireless transceiver are unknowns. The least square problem can be solved using the computed time of flight values from the transmission made between the objects. In a general sense, a robust non-linear least square solver may be used to solve this problem and such solvers are readily found in the art. For example, a Gauss-Newton method or a gradient descent method may be used to solve the least squares problem. Another example method is the max mixtures approach described in an article by Edwin Olson et. al. entitled "Inference on Networks of Mixtures for Robust Robot Mapping" International Journal of Robotics Research, 32(7):826-840, July 2013 which is incorporated in its entirety by reference. Other methods for solving non-linear least square problems also fall within the scope of this disclosure.

Figure 5:
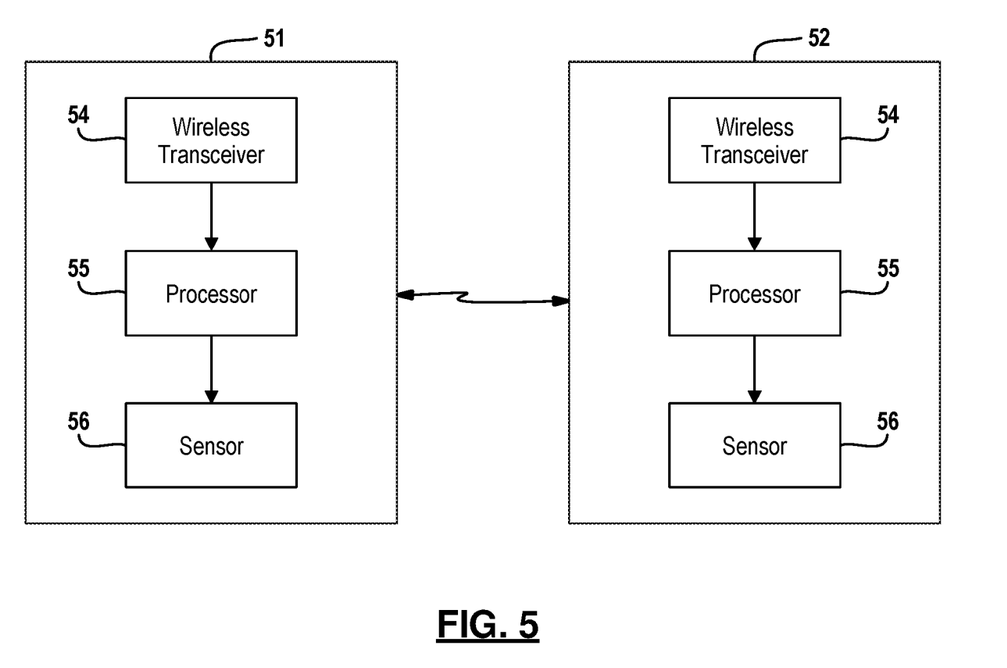
FIG. 5 is a diagram depicting a system of two example objects.

FIG. 5 further depicts a system of two objects, for example robots. Each robot 51, 52 is equipped with a wireless transceiver 54 and a computer processor 55. The wireless transceiver 54 is configured to transmit messages between the robots. In an example embodiment, the wireless transceiver operates in accordance with ultra-wideband radio technology although other types of wireless transmission schemes, such as WiFi or GPS, are contemplated by this disclosure.

Transmission and reception times for transmitted messages are forwarded by the wireless transceiver 54 to the computer processor 55. The computer processor 55 in turn computes time of flight values and estimates location for other objects from which transmissions are received by the given object using the localization method described above. The localization method may be implemented by executable instructions stored in a data store (i.e., memory) and executed by the on-board computer processor 55.

In one embodiment, each robot is also configured with a sensor 56 that is configured to measure movement of the robot. For example, the sensor may be an encoder that measures and reports rotation of one or more wheels which are capable of moving the robot. In another example, the sensor may be an odometer. In yet another example, the sensor may be a GPS receiver. Movement measured by the sensor may be used to further constrain the location estimate for the robot. Constraining occurs because the additional measurements of the change in one robot or device's location can be observed. This is added to the factor graph as an equation in the least squares problem that is used to optimize over in addition to the other constraints. This position factor is indicated by squares marked by xy in FIG. 4. Other types of sensors, including but not limited to IMUs cameras and laser scanners, also fall within the scope of this disclosure.

Figure 6:
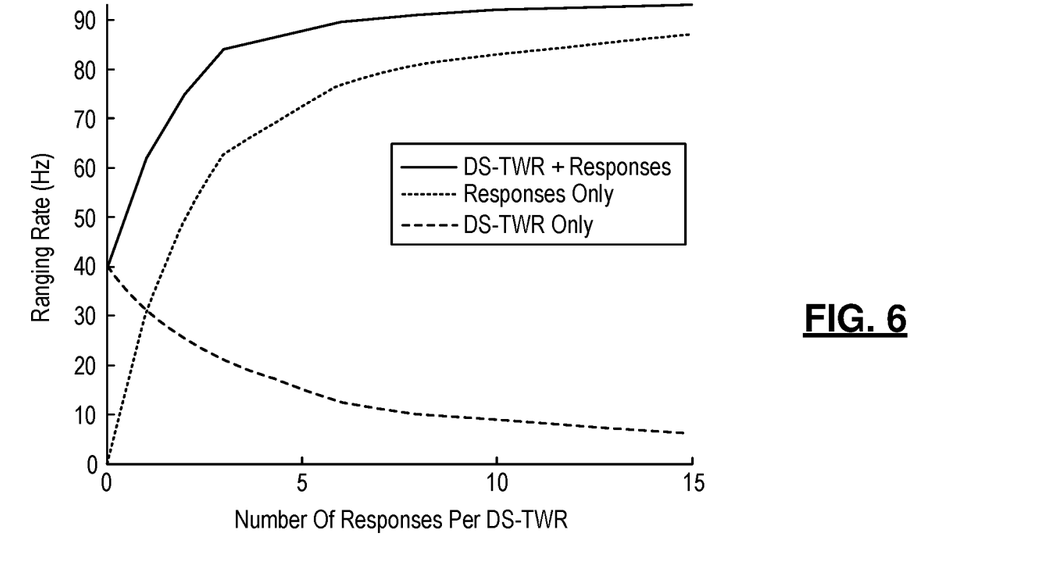
FIG. 6 is a graph showing the ranging rate gain by using more responses at the cost of fewer DS-TWR messages, as determined by hardware implementation. By increasing the proportion of transmissions that are single-direction responses, one can achieve a higher rate of range measurements at the cost of fewer DS-TWR measurements.
Figure 7:
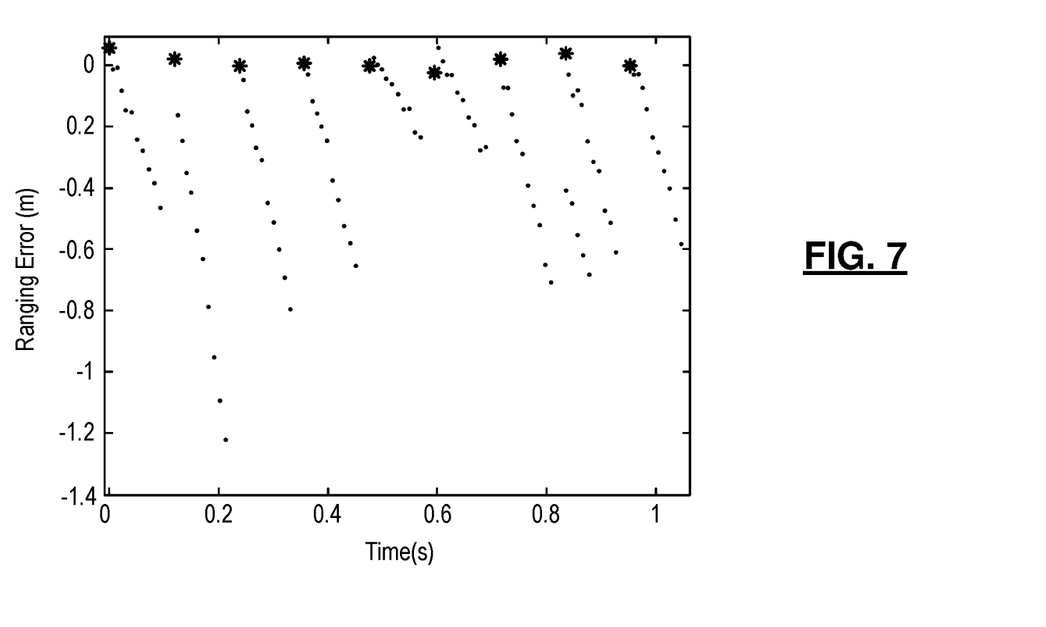
FIG. 7 is a graph showing a demonstration of the how range error diverges when frequency is poorly modeled with DS-TWR-MA. The asterisks are DS-TWR measurements and the points show the error for additional responses increasing with how many responses occurred.
Figure 8A:
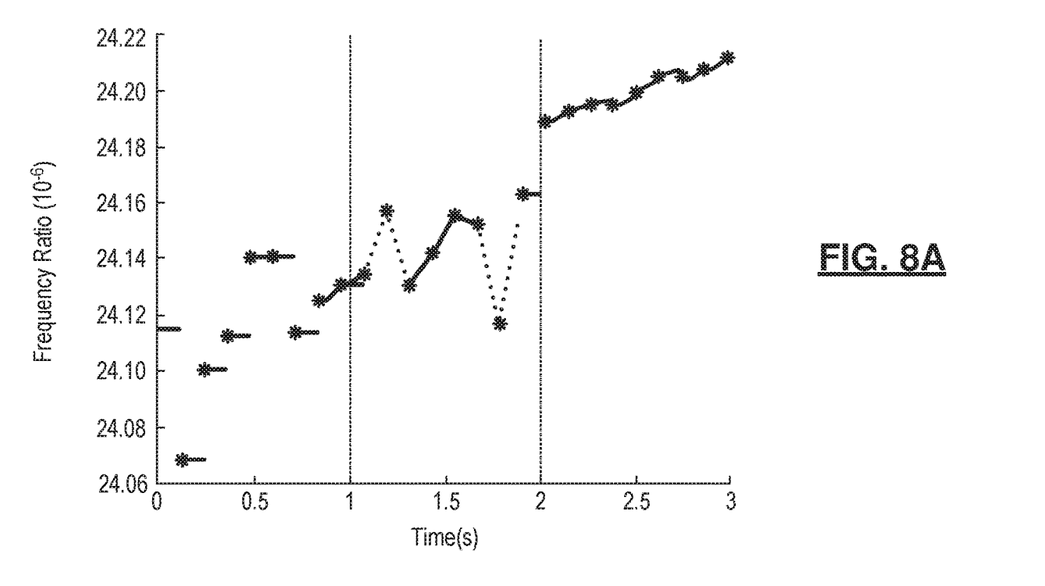
FIGS. 8A and 8B are graphs showing how the proposed latent method outperforms two other modeling methods for DS-TWR-MA in estimating frequency and minimizing error, respectively. The asterisks represent full DS-TWR measurements and the points represent measurements from additional responses. The processing method changes at t=1 and t=2 from DS-TWR-MA with a zero order hold estimate of the frequencies to DS-TWR-MA with linear interpolation of the frequencies to the proposed method of latent modeling the frequencies. The first two methods are causal, while the proposed method smooths over time as it explains errors in ranging and frequency estimate in a joint framework. If the left frequency plot were flat or linear in time, the clocks would be stable and easily synchronizable, as a zero order hold or linear approximate would be accurate.
Figure 8B:
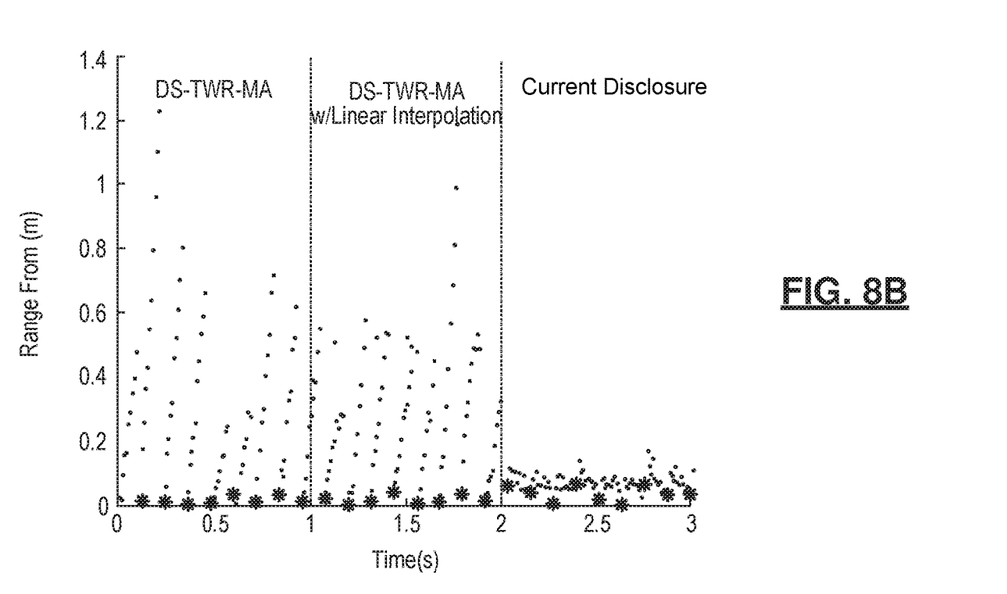

Performance of the proposed localization method in relation to the DS-TWR approach is discussed below. The DS-TWR approach requires at least three transmissions for each range measurement. With multiple response, DS-TWR-MA can realize an amortized 1.5 transmissions for each range measurement before the clock synchronization assumption begins to fail, as seen in FIGS. 7 and 8. With the proposed latent modeling approach, use k response and for an amortized $$n = \frac{3+k}{1+k} \quad (10)$$

transmissions per range measurement. Having fewer transmissions per range measurement is advantageous for scalability: the ranging rate as function of the number of responses sent for each DS-TWR is shown in FIG. 6, which shows that a higher proportion of response DS-TWR measurements increases the ranging rate.

Figure 9:
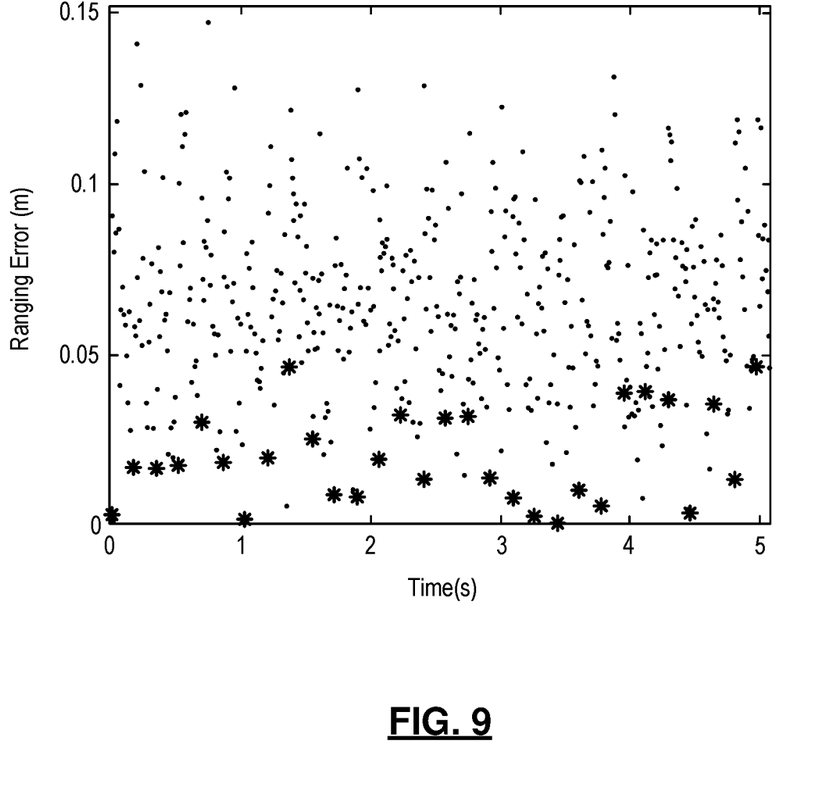
FIG. 9 is a graph showing the absolute range error between two static devices with 15 additional responses per DS-TWR using the proposed method. The asterisks represent DS-TWR measurements, and the points are ranges from multiple responses with latent modeling of frequency drift. The multiple response values are noisier than the full DS-TWR range measurements, but take only one transmission.
Figure 10A:
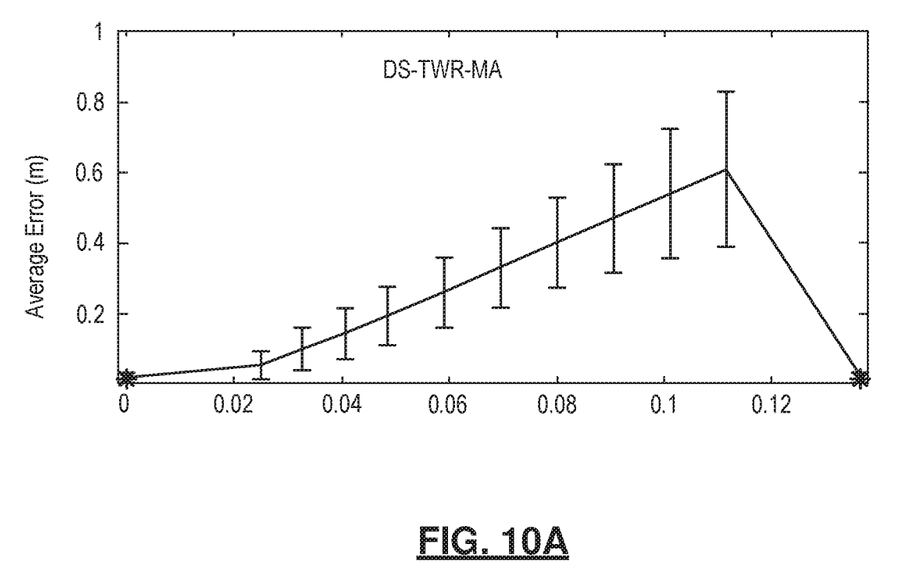
FIGS. 10A and 10B are graphs comparing two ranging methods ranging rate and errors between a pair of ranging nodes. The standard DS-TWR range method has infrequent measurements that are limited by error in time resolution of message reception. The asterisks near where error is zero are DS-TWR events and the remaining points represent ranges calculated from the multiple responses.
Figure 10B:
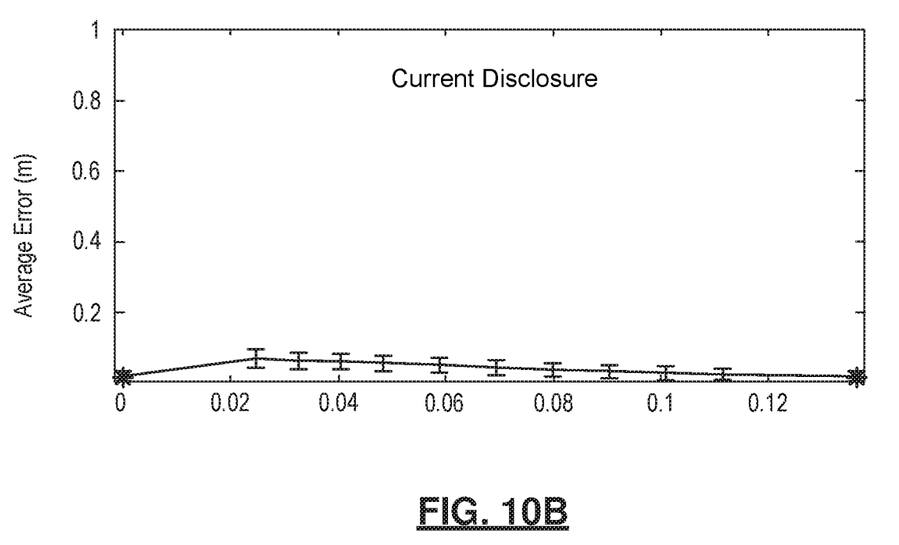

The effect of the latent modeling on range calculations can be visualized in FIG. 10, where DS-TWR has a stable error bound but infrequent measurements. DS-TWR-MA makes additional transmissions closely following each DS-TWR measurement with increasing error. The proposed latent method uses more measurements than DS-TWR-MA and treats frequency as a latent variable to connect estimates and decrease the maximum error bound. The error in range measurements for hardware trials is seen in FIG. 8, where 10 responses are sent for each DS-TWR message. The error is well constrained at the limit of what DS-TWR-MA is capable of and the ranging rate is 2.2 times as fast as running pure DS-TWR. The absolute range errors for 15 responses per DS-TWR is shown in FIG. 9, which shows DS-TWR accurate to within 0.05 m and the multiple responses at with 0.15 m.

The proposed latent modeling method smooths data and eliminates error by explicit use of frequency as an explanatory variable The latent model approach can directly integrate with other sensors in the factor graph framework and result in mutual reduction in error as noise in other sensors and noise in frequency measurements can both be recognized as outliers. The frequency model can be modified to accommodate non-Gaussian random walk representations of frequency drift.

Latent oscillator frequency estimation for ranging measurements provides an error minimization effects to frequency estimation and allows multiple responses to robustly inform estimation. Other sensors and estimates in the factor graph can influence the calculators and improve the accuracy by eliminating noise in an error minimization framework. This approach is a novel way of estimating clock frequencies and reducing the overhead in of range measurements when clocks cannot be synchronized. It is also conductive to scaling in a large network due to the reduction in transmissions required and shared information available for optimizing ranging measurements.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for determining location of objects in a space, each object is equipped with a wireless transceiver and transmits messages amongst the objects via the wireless transceiver, comprising:
  modeling a system of objects using a factor graph having a plurality of variable vertices interconnected by a plurality of factor vertices, where a given variable vertex in the factor graph represents a location of a particular object at a given time and another variable vertex corresponding to the given variable vertex represents frequency of an oscillator driving the wireless transceiver of the particular object;
  modeling location of a particular object over time as a chain in the factor graph and modeling frequency of an oscillator over time as a chain the factor graph;
  constraining location estimates using range factors, where range factors are represented by factor vertices that interconnect location vertices and frequency vertices a given variable vertex to another variable vertex corresponding to the given variable vertex and representing frequency;

computing by a given object, time of flight for each of a plurality of transmissions between the given object and objects in the space from which transmissions are received by the given object; and estimating, by the given object, location of the objects in the space using the computed time of flight values for the plurality of transmissions and the factor graph.

2. The method of claim 1 wherein the range factor is defined as a difference between an expected range based on distance between objects and a time of flight measurement with scaling based on an estimate of relative frequencies of the two objects at the time the measurement took place.

3. The method of claim 2 further comprises constraining location estimates using position factors, where position factors are represented by factor vertices that interconnect the variable vertices that represent location.

4. The method of claim 3 further comprises measuring movement of the given object using a sensor associated with the object and constraining location estimates for the given object using the measured movement.

5. The method of claim 4 further comprises constraining location estimates using frequency factors, where frequency factors are represented by factor vertices that interconnect the variable vertices that represent frequency.

6. The method of claim 5 wherein the frequency factor is modeled as a zero mean Gaussian.

7. The method of claim 1 wherein computing time of flight further comprises transmitting messages over time amongst the objects in the space and computing time of flight values between objects using the plurality of transmitted messages.

8. The method of claim 1 wherein estimating location of the objects further comprises solving a least squares problem using the computed time of flight values for the plurality of transmissions.

9. The method of claim 8 further comprises solving a least square problem using one of a gradient descent method or a Gauss-Newton method.

10. The method of claim 1 further comprise directly observing frequency of an oscillator in one or more objects and updating the factor graph using the observed frequencies.

11. The method of claim 1 wherein at least one of the modeled objects in the factor graph includes an atomic clock.

12. A computer-implemented method for determining location of objects in a space, each object is equipped with a wireless transceiver and transmits messages amongst the objects via the wireless transceiver, comprising:

modeling a system of objects using a factor graph, the factor graph having a plurality of variable vertices interconnected by a plurality of factor vertices, where a given variable vertex in the factor graph represents a particular location of a particular object at a given time and an associated variable vertex corresponding to the given variable vertex that represents frequency of an oscillator driving the wireless transceiver of the particular object and a chain in the factor graph representing the frequency of the oscillator over time;

transmitting a plurality of messages over time amongst the objects in the space, computing, by a given object, time of flight for each of the plurality of messages between the given object and objects in the space from which messages are received by the given object; and estimating, by the given object, location of the objects in the space while constraining location estimates using frequency factors, where estimating location of objects is performed using the computed time of flight values for the plurality of transmissions and the frequency factors are represented by factor vertices that interconnect the variable vertices that represent frequency.

13. The method of claim 12 wherein the frequency factors are modeled as a zero mean Gaussian.

14. The method of claim 13 further comprises constraining location estimates using range factors, where range factors are represented by factor vertices that interconnect a given variable vertex to another variable vertex corresponding to the given variable vertex and representing frequency.

15. The method of claim 14 wherein the range factor is defined as a difference between an expected range based on distance between objects and a time of flight measurement with scaling based on an estimate of relative frequencies of the two objects at the time the measurement took place.

16. The method of claim 15 further comprises constraining location estimates using position factors, where position factors are represented by factor vertices that interconnect the variable vertices that represent location.

17. The method of claim 16 further comprises measuring movement of the given object using a sensor associated with the object and constraining location estimates for the given object using the measured movement.

18. The method of claim 1, wherein the location of the objects is estimated jointly with frequency.

19. The method of claim 12, wherein the location of the objects is estimated jointly with frequency.

* * * * *